(12) United States Patent
Kozak (10) Patent No.: US 6,558,080 B2
(45) Date of Patent: May 6, 2003

(54) METHODS AND COMPACT APPARATUS FOR COVERING LANDFILL

(75) Inventor: Randall Jeff Kozak, Surrey (CA)

(73) Assignee: EPI Environmental Technologies Inc., Conroe, TX (US)

( * ) Notice: Subject to any disclaimer, the term of this patent is extended or adjusted under 35 U.S.C. 154(b) by 0 days.

(21) Appl. No.: 09/840,390

(22) Filed: Apr. 23, 2001

(65) Prior Publication Data

US 2001/0048853 A1 Dec. 6, 2001

Related U.S. Application Data

(63) Continuation-in-part of application No. 09/566,718, filed on May 9, 2000, now abandoned.

(51) Int. Cl.$^7$ .................................................. B09B 5/00
(52) U.S. Cl. ..................... 405/129.9; 405/270; 405/38; 172/324; 172/325; 172/458; 172/502; 172/701
(58) Field of Search ........................... 111/1, 3, 10, 85, 111/63, 67; 47/56, 9; 405/37, 38, 174, 176, 179, 258.1, 270, 129.9; 172/324, 325, 326, 327, 328, 458, 502, 668, 701

(56) References Cited

U.S. PATENT DOCUMENTS

| | | | |
|---|---|---|---|
| 1,709,244 A | * 4/1929 | Abbe | |
| 3,204,589 A | 9/1965 | Blackhurst et al. | 111/91 |
| 3,309,875 A | 3/1967 | Niederwemmer | 61/13 |
| 3,583,164 A | 6/1971 | Sherrill | |
| 3,590,588 A | 7/1971 | Draper | 61/11 |
| 3,597,927 A | 8/1971 | Hemphill | |
| 3,782,068 A | 1/1974 | Woyden et al. | 53/64 |
| 3,833,401 A | 9/1974 | Ingram | 117/38 |
| 3,905,313 A | 9/1975 | Grether | 111/1 |
| 3,980,029 A | 9/1976 | Huggett | 111/1 |
| 3,992,986 A | 11/1976 | Sutton | 100/7 |
| 4,050,972 A | 9/1977 | Cardinal, Jr. | 156/71 |
| 4,092,936 A | 6/1978 | Griffin et al. | 111/1 |
| 4,154,549 A | 5/1979 | Zaslavsky et al. | 405/38 |
| 4,175,496 A | 11/1979 | Rehbein | 111/1 |
| 4,261,520 A | 4/1981 | Hetrick | 239/657 |
| 4,285,161 A | 8/1981 | Kawasaki et al. | 47/9 |
| 4,303,507 A | 12/1981 | Smith | 209/252 |
| 4,513,530 A | 4/1985 | Nyboer | 47/9 |
| 4,521,980 A | 6/1985 | Solaja | 37/117.5 |

(List continued on next page.)

FOREIGN PATENT DOCUMENTS

| | | |
|---|---|---|
| CN | 596748 | 3/1978 |
| DE | 4106687 A1 | 10/1991 |
| DE | 29606272 U1 | 7/1996 |

(List continued on next page.)

OTHER PUBLICATIONS

Waycon Manufacturing Ltd, Enviro Cover Deployer, R&D 1 page, Gallery 2 photographs, 5 pages, date unknown, from www.wayconcanada.com.*

(List continued on next page.)

Primary Examiner—Heather Shackelford
Assistant Examiner—Katherine Mitchell
(74) Attorney, Agent, or Firm—Conley Rose, P.C.

(57) ABSTRACT

An apparatus and method for covering landfill includes a deployer suspended below the bucket of a loader. A roll of film is disposed on the deployer and uncoiled to deploy a film covering on the landfill surface as the loader driven across the surface. Periodically, the bucket, containing a ballast material, is manipulated, allowing ballast material to be disposed on the film to hold the deployed film in place. In a preferred embodiment, the deployer includes a mandrel mounted between two flanges for supporting a roll of film. The deployer is preferably attached to the bucket by chains or wire rope in such a manner so as to allow full operation of bucket while the deployer is attached. In one embodiment, the apparatus includes a sprayer to apply a fluid.

66 Claims, 4 Drawing Sheets

U.S. PATENT DOCUMENTS

| | | | |
|---|---|---|---|
| 4,616,957 A | 10/1986 | Burrows et al. | 405/179 |
| 4,636,112 A | 1/1987 | Raviv | 405/176 |
| 4,705,427 A | 11/1987 | Atkins et al. | 405/36 |
| 4,720,212 A | 1/1988 | Steenbergen et al. | 405/176 |
| 4,724,781 A | 2/1988 | Higashimura et al. | 111/1 |
| 4,771,570 A | 9/1988 | Nyboer | 47/9 |
| 4,786,208 A | 11/1988 | Raviv | 405/176 |
| 4,796,711 A | 1/1989 | Chrysler | 171/1 |
| 4,838,734 A | 6/1989 | Pinto | 405/176 |
| 4,884,724 A | 12/1989 | Schmid | 222/623 |
| 4,888,913 A | 12/1989 | Hoeft | 47/9 |
| 4,909,667 A | 3/1990 | DeMello | 405/128 |
| 4,927,317 A | 5/1990 | Acosta | 414/724 |
| 4,950,106 A | 8/1990 | Richter | 405/128 |
| 4,953,482 A | 9/1990 | Emily | 111/144 |
| 5,009,175 A | 4/1991 | Pember et al. | 111/173 |
| 5,067,272 A | 11/1991 | Constantz | 47/27 |
| 5,070,641 A | 12/1991 | Brockington | 47/9 |
| 5,082,397 A | 1/1992 | Ravi | 405/176 |
| 5,096,158 A | 3/1992 | Burdick et al. | 251/144 |
| 5,108,038 A | 4/1992 | Palladino et al. | 239/661 |
| 5,111,933 A | 5/1992 | Di Biasi et al. | 206/223 |
| 5,129,735 A | 7/1992 | Neal et al. | 383/109 |
| 5,199,196 A * | 4/1993 | Straley | |
| 5,201,609 A | 4/1993 | Johnson | |
| 5,226,376 A | 7/1993 | Shaw | 111/144 |
| 5,259,698 A | 11/1993 | Garzon | 405/129 |
| 5,261,171 A | 11/1993 | Bishop | 37/142.5 |
| 5,304,014 A | 4/1994 | Slutz | 405/129 |
| 5,416,133 A | 5/1995 | Garcia et al. | 523/124 |
| 5,536,116 A | 7/1996 | Lammers et al. | 405/129 |
| 5,553,446 A | 9/1996 | Sibley et al. | 56/341 |
| 5,562,365 A * | 10/1996 | Berrange | |
| 5,565,503 A | 10/1996 | Garcia et al. | 523/124 |
| 5,582,572 A | 12/1996 | Bianchi | 588/252 |
| 5,620,281 A | 4/1997 | Lammers et al. | 405/129 |
| 5,679,421 A | 10/1997 | Brinton, Jr. | 428/34.3 |
| 5,694,742 A | 12/1997 | Elliott et al. | 53/436 |
| 5,709,071 A | 1/1998 | Cosimati | 56/327.1 |
| 5,760,118 A | 6/1998 | Sinclair et al. | 524/306 |
| 5,863,153 A | 1/1999 | Bachell et al. | 405/129 |
| 6,050,066 A | 4/2000 | Brodecht | 53/576 |
| 6,123,480 A | 9/2000 | Petty et al. | 403/164 |
| 6,264,400 B1 * | 7/2001 | Gent | 405/129.75 |

FOREIGN PATENT DOCUMENTS

| | | |
|---|---|---|
| EP | 0216412 | 4/1987 |
| EP | 579322 A1 | 1/1994 |
| GB | 2179386 | 3/1987 |
| GB | 2179386 A | 3/1987 |
| GB | 2288598 | 10/1995 |
| JP | 4131171 | 5/1992 |
| SU | 718530 | 3/1976 |
| SU | 718530 A | 2/1980 |
| WO | 9203915 | 3/1992 |
| WO | WO 97/27008 | 7/1997 |
| WO | 9839113 | 9/1998 |

OTHER PUBLICATIONS

PCT International Search Report for Ser. No. PCT/US01/13259–9 pages.

PCT International Search Report for Ser. No. PCT/US01/21875–7 pages.

Provisional Patent application in Australia in the name of EPI Environmental Products Inc.; entitled *Apparatus For Laying Plastic Film on a Landfill*; dated Sep. 26, 1997; specification (8 pg.); drawings (15 sheets).

Geo Hess (UK) Limited; Geo Hess The Natural Solution; *Geo Hess Landfill Cover Materials*; (undated)(4 p.).

* cited by examiner

METHODS AND COMPACT APPARATUS FOR COVERING LANDFILL

CROSS REFERENCE TO RELATED APPLICATIONS

The present application is a continuation in part of U.S. patent application Ser. No. 09/566,718 entitled "Compact Apparatus for Covering Landfill" filed on May 09, 2000.

BACKGROUND OF THE INVENTION

1. Field of the Invention

The present invention is directed to a method and apparatus for laying a cover on a landfill, and more particularly to a method and apparatus for laying a cover on the landfill, and depositing ballast on the cover.

2. Description of the Related Art

Landfills have become highly regulated in recent years with an emphasis on minimizing their impact to surrounding populations and the environment. Regulatory agencies, like the Environmental Protection Agency of the United States, mandate requirements for landfill design and maintenance in an attempt to minimize the potential for odors, ground water contamination, fires, blowing litter, disease vectors, and vermin infestation. In an attempt to prevent such undesirable occurrences, regulatory agencies have adopted strict restrictions and codes as to the construction and covering of landfills.

Often, new landfills are created with a liner constructed of a polymeric film to cover the bottom of the landfill to prevent water contamination and disease vectors. The liner is used to prevent seepage from the waste stored on top of the liner from entering into the community water table located underground. Most often, the liner is installed by overlapping sections of film laid along the bottom of the recently excavated landfill and heat sealing the sections together to ensure that no liquid seeps through the liner between the panels of film and into the virgin ground underneath the landfill. It is preferred that such a liner have a long life expectancy and not degrade so that the water table may be separated from the landfill for as long as possible. Once the liner and a required minimum soil cover has been deposited over the base of the landfill, waste materials can then be accepted onto the landfill for disposal.

Landfill covers are required by regulatory agencies at the end of every workday and for landfill sections that are to be left inactive for extended periods of time. Regulatory agencies require exposed waste to be covered in order to reduce the effects of fires, odor, vermin, litter, and disease on nearby populations. It is understood that the open face of a landfill is the surface of compacted trash and garbage, a portion of which is enclosed in plastic bags, and other waste, but can also contain tree pieces, cans, small appliances, wood, shingles, building materials of all kinds, dirt, sludge, or any other material permitted in a landfill. Traditionally, soil was used as the primary means of cover and was applied upon deposited waste in amounts governed by how long the section of the landfill is to remain inactive.

Many current regulations require daily coverage of exposed waste with the daily cover including a minimum of six (eight in some locations) inches of soil applied to the landfill workface. Due to the non-homogeneous layout of most landfills, such a layer of soil may actually reach from 12 to 15 inches in height in certain areas in order to ensure that the six inch minimum exists throughout. Careful planning and management must be applied to each landfill installation to ensure that the utility of the available airspace is maximized. For this reason, landfills are preferably filled in sections, rather than all at once. The accepted process for waste material disposal is to section off a portion of the landfill for the day's fill and to deposit material there, compact throughout the day, and then cover the section at day's end.

To maximize the effective use of landfill space, the waste is compacted. Compaction is usually performed in two stages, prior to and after waste deposit in the landfill. Compaction prior to delivery at the landfill is usually performed either by the trash collection trucks or at separate compaction or bailing facilities. Generally, household waste, as collected, is between 250 to 300 $lb/yd^3$ in density. Collection trucks are able to further compact this waste to 400–700 $lb/yd^3$ and bailing facilities are capable of compacting waste to levels exceeding 1000 $lb/yd^3$ in density. Once brought to the landfill facility, waste is deposited into a section of landfill and is further compacted by driving compaction equipment over and about the exposed waste.

Examples of the compaction equipment used for this purpose ranges from dedicated compactors, to standard earthmovers and bulldozers. The size, weight, and range of compaction equipment generally corresponds to the size of the landfill installation, with the largest landfills having the most diverse and heaviest equipment. The compaction equipment is used to move and compact waste material within the deposit zone with its attached blade or bucket device. Once the initial placement and compaction is performed, the compaction equipment is then driven over the deposited waste material several times throughout the workday, further compacting the deposited fill waste. The fill is compacted, preferably using an area, trench or ramp method, into an open face which is typically inclined at angle of from 5° to 20°.

Studies have shown that 3 to 4 compaction cycles provide the ideal amount of compaction for any given weight of machine and that increasing the number of compaction cycles beyond 4 typically yields little gain in effective compactions. Once placed and compacted within the landfill, the same ordinary household waste that began at 250–300 $lb/yd^3$ is now stored within the landfill at 600–1500 $lb/yd^3$, with the actual amount of compaction depending on the weight and size of the equipment utilized and the number of compactions.

Because waste storage capacity is a landfill's most precious commodity, the traditional soil method of covering the waste has become less and less popular in recent years. In response to the recent demands for more efficient usage of landfill space, alternative daily cover, or ADC, systems have been suggested. The primary goal of an ADC is to perform all of the functions of an eight to six inch layer of soil without the drawback of consuming large amounts of landfill capacity. Attempts have been made to cover landfills with removable tarps, but it has been shown that the deployment and retrieval processes are difficult and labor intensive. Nondegradable disposable plastic liners that are designed to be left in place have been proven to take up little landfill space but are considered potentially dangerous because of their tendency to trap methane and other gasses generated by the waste within the layers of the fill.

One ADC that has been widely accepted is the use of a degradable polyolefin film as disclosed in U.S. Pat. Nos. 5,416,133 and 5,565,503, both hereby incorporated herein by reference. The degradable film of polyolefin is desirable as an ADC because it conserves valuable fill capacity and degrades quickly enough (either through chemical, photo, stress, thermal, or biodegradation) to reduce the potential for the buildup of gasses between fill layers. Apparatuses and methods for deploying degradable film is disclosed in U.S. Pat. Nos. 5,536,116 the "116 patent") and 5,620,281 and U.S. patent application Ser. No. 09/510,956, filed Feb. 22, 2000 all hereby incorporated herein by reference.

The apparatus disclosed in the '116 patent includes a film deployment apparatus that may be disposed on the blade of a tractor or other prime mover. The deployment apparatus is attached to the blade, usually by chains, hooks, or both. The tractor is usually powered by a diesel engine while the blade, which may be lifted and lowered, is operated by hydraulic fluid lines and a conventional electrical system. The required hydraulic and electrical power needed to operate the deployment apparatus may be obtained from the tractor by conventional hydraulic and electrical take-off lines. Alternatively, the power, fuel and hydraulic systems may be self contained on the deployment apparatus. After the deployment apparatus is attached to the blade, it may be lifted off the ground by actuating a hydraulic cylinder. When not used to support the deployment apparatus, the blade is used to push the waste fill into the operating area of the landfill.

The deployment apparatus operates by unrolling a panel or width of film from a roll of film rotatably mounted on the deployment apparatus as the tractor moves over the workface of the landfill. Frequently, below the roll of film is at least one roller which draws the film back and down as it is unrolled from the film roll. The roller draws the film as close to the workface of the landfill as quickly as possible, thus allowing the film to unroll over the exposed workface of the landfill and seal off deposited waste from the elements and scavenging animals. Once a layer of film is deposited, the film is cut, either by hand or automated device, and the tractor is returned to the top of the workface to lay another layer of film adjacent to the first layer with several inches of overlap. This process is repeated until the entire day's fill is covered.

Because the film that is laid upon the landfill would otherwise be susceptible to being blown away, the deployment apparatus also deposits ballast on the film as it is laid. The ballast can take the form of any solid or semi-solid medium but is preferably soil. The deployment apparatus contains hoppers that are preferably large enough to hold enough ballast to complete the daily cover operation without refilling. Mechanical apparatus direct the ballast out of the hoppers through outlets, where the ballast is deposited onto the desired locations of laid film.

Each layer of film generally is deployed by positioning the tractor at the top of the area to be covered so that the film is deployed as the tractor backs down the face of the landfill. The film is extended outward of the deployment apparatus and positioned under the guide roller. At the start of each pass of film, the ballast distribution mechanism is activated to deposit ballast upon the leading edge of film. The weight of the deposits of ballast is sufficient to hold the leading edge of the film in place while the tractor with attached deployment apparatus is backed down the workface of the landfill. At intervals selected by the operator, which are either accumulated manually or automatically, additional deposits of ballast are made to help secure the film in place atop the workface of the landfill. Additionally, when beginning a pass over the workface, the film can be temporarily attached about the roller in such a fashion that the weight of the first deposit of ballast frees the film from the roller and allows deployment without assistance.

With the film secured in place atop the workface by the ballast, the requirements for an ADC are met using a system that consumes much less landfill space than the traditional soil cover method. Traditional soil cover systems cost landfill operators a large amount of resources in terms of equipment required and effective fill capacity. A traditional soil cover system requires a large amount of soil to be located nearby and more machinery to emplace than a degradable film cover system.

The apparatus '116 patent is designed for large amounts fill space which must be covered with high frequency. For small landfills, such as those for remote municipalities, a smaller, less expensive apparatus to deploy film and ballast is highly desirable. Because of the lesser amount of waste deposited each day, small-scale fills are typically in a position to benefit even more from ADC systems than their larger counterparts. For such small-scale facilities, the soil cover material represents a higher percentage of the fill capacity than at larger facilities.

The present invention overcomes the deficiencies of the prior art.

BRIEF SUMMARY OF THE INVENTION

The apparatus and method of the present invention enables a landfill operator to deploy a film material from a standard bucket loader to the working surface of a landfill. The apparatus is preferably attached to the bucket assembly of loader and deploys film as the loader is driven over the working surface of the landfill. Periodically, at intervals determined by the operator, the bucket, which contains a ballast material, is manipulated to allow ballast material to drop onto the film and hold the deployed film in place. In a preferred embodiment, the apparatus includes a roll of film mounted on a mandrel between two flanges. Such an apparatus is preferably attached to the bucket device through chains or wire rope in such a manner as to allow full operation of the bucket while the apparatus is attached. The apparatus of the present invention is also capable of spraying a pesticide, deodorant, or any other chemical, to the exposed working surface. If more than one panel is required to cover the work area, it is preferred that adjacent panels, with some overlap, be laid.

BRIEF DESCRIPTION OF THE DRAWINGS

For a detailed description of a preferred embodiment of the invention, reference will now be made to the accompanying drawings wherein:

FIG. 4 is an end view of the attachment guard of FIG. 2;

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
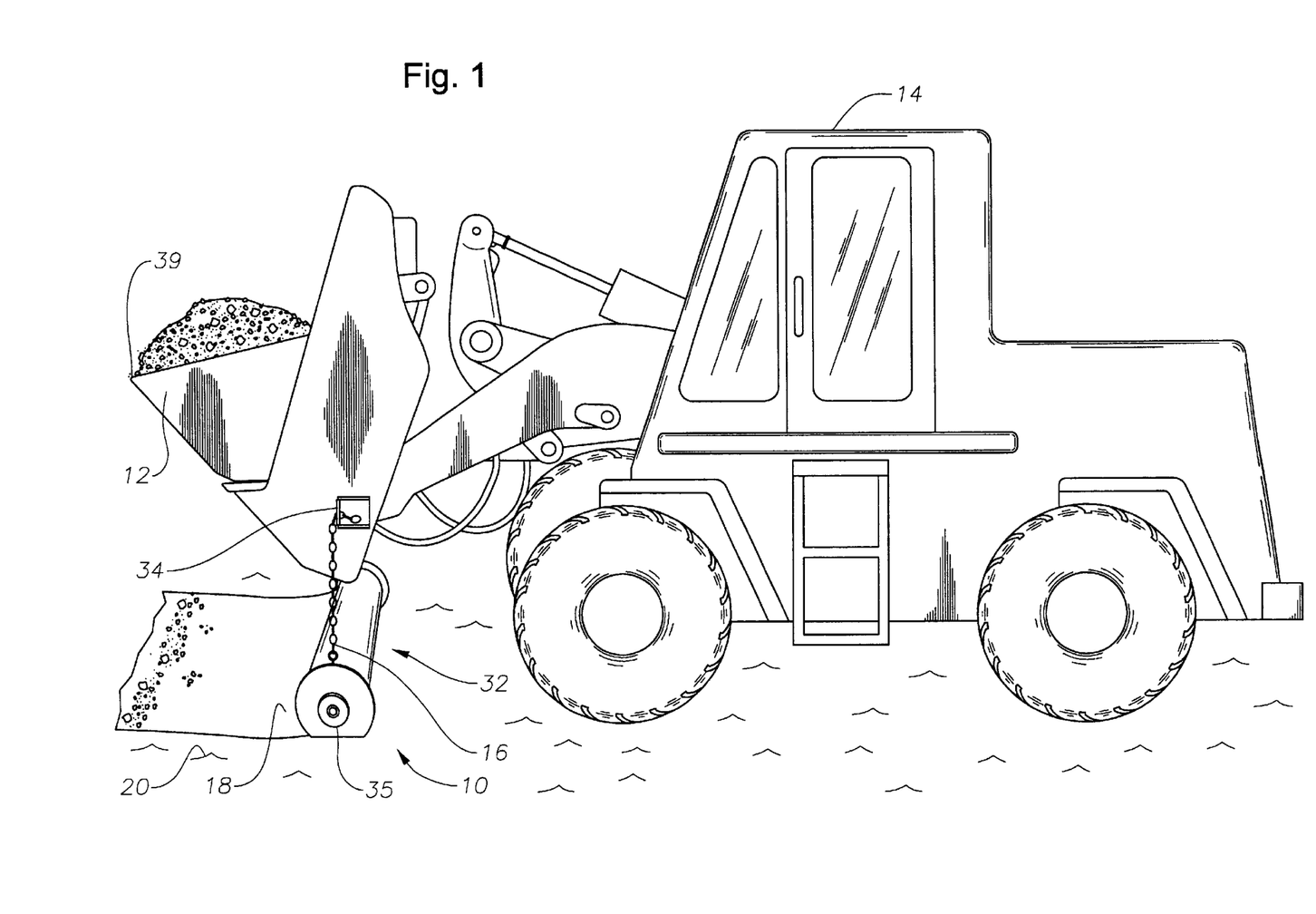
FIG. 1 is a side view of a wheel loader and film deployer in accordance with the present invention.

Referring initially to FIG. 1, a film deployment apparatus 10 in accordance with a preferred embodiment is shown. Deployment apparatus 10 is preferably attached to the front end 12 of a loader 14 such as to a container or bucket by any pair of suitable members such as chains 16. The chains 16 support a roll of film 18. As is well known in the art, the bucket 12 may be raised, lowered and tilted hydraulically by controls. Deployment apparatus 10 lays a panel of film 18 over a work surface 20, as hereinafter described, as loader 14 is driven thereover.

Figure 2:
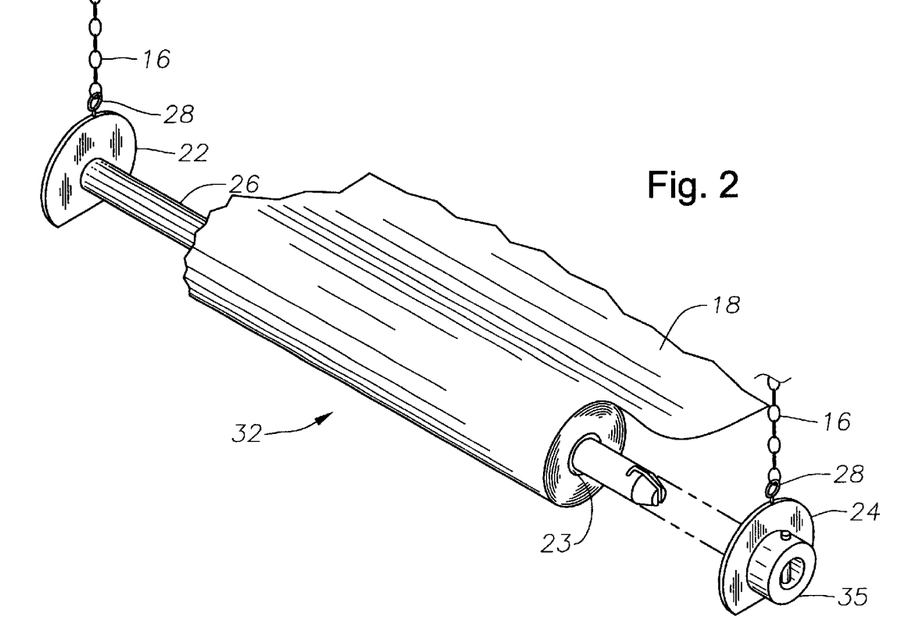
FIG. 2 is an exploded view drawing of the film deployer of FIG. 1.

Referring now to FIGS. 1 and 2, apparatus 10 preferably includes a mandrel 26 having a flange 22 fixed at one end and a flange 24 detachably connected to the opposite end of mandrel 26. Mounted upon each flange 22, 24 is a connection member such as an eyelet 28 by which deployment apparatus 10 preferably attaches bucket 12 by attaching chains 16 between eyelets 28 and hooks 34 mounted upon sides of bucket 12. The chains 16 suspend apparatus 10 below the bucket 12 taking advantage of the gravitational pull; as the bucket 12 is tilted. Although chains 16 are shown in the preferred embodiment, it can be understood that any other means of attachment can be utilized including but not limited to rope, wire, cables or rigid structural members. Also, while attachment chains 16 are shown in FIG. 2 to be equal in length causing mandrel 26 to be suspended at equal lengths from deployment apparatus 10 resulting in a substantially horizontal mandrel 26, it should be understood that the relative lengths of chains 16 may be adjusted to allow mandrel 26 to be suspended at differing lengths from deployment apparatus 10 causing mandrel 26 to be at an angle with respect to work surface 20 or bucket 12.

It is also preferred that flanges 22 and 24 be strong enough to resist bending if chains 16 extend inward or outward. Depending on the size of the bucket 12 and width of roll 32 of film, chains 16 may have to angle inward or outward to connect the two together. To strengthen flanges 22 and 24, they may be manufactured of a thicker material, or structural braces may be attached.

In the preferred embodiment, film roll 32 includes a length of film 18 that has been circumferentially rolled up around a tubular axle (not shown) having a bore therethrough for receiving mandrel 26. Mandrel 26 is installed by first removing detachable flange 24 and then sliding the free end 33 of mandrel 26 through the bore or film roll 32 until the end of the roll engages flange 22. Mandrel 26 acts as a spindle and preferably combines with flanges 22 and 24 to form a spool. To facilitate ease of lifting, mandrel 26 is preferably constructed in a generally tubular fashion. Film roll 32 is preferably constructed such that its inner diameter is slightly larger than outer diameter of mandrel 26 to allow film 18 to "roll" off as it is pulled from roll 32. Alternatively, bearings may be installed between roll 32 and mandrel 26 to facilitate ease of deployment. Alternatively still, bearings 23 may be positioned between flanges 22, 24 and film roll 32 to allow film 18 to be deployed directly to work surface 20 without requiring mandrel 26. Such bearings 23, if used, may be of sleeve, journal, roller or ball bearing type.

Film 18 is preferably degradable through chemical, mechanical, thermal, photo, or biodegradation. Although deployer 10 preferably deploys a degradable film material, it can be used to deploy any material for covering the landfill and may be degradable or non-degradable. The material is preferably stored in rolled form. For example, non-degradable films may be deployed for more permanent or long term cover or lining applications. Alternatively, breathable textile materials may also be deployed on landfill surfaces as effective short or long-term cover. Examples of breathable textile materials for landfill cover are described in United Kingdom patent Application No. GB9407807.8 entitled "Waste Disposal," hereby incorporated herein by reference. Examples of film 18 which are degradable are described in U.S. Pat. Nos. 5,416,133 and 5,565,503 incorporated by reference above.

Flanges 22 and 24 preferably include a sector cut 30 along their bottom edges to facilitate installation of film roll 32. Sector cuts 30 of flanges 22 and 24 enable mandrel 26 and flange 22 to be installed within roll 32 while flanges 22, 24 rest upon a surface without rolling. Otherwise, depending on its outer diameter, film roll 32 may have to be lifted in order to receive mandrel 26 and attached flange 22 completely through the tubular axle. Once film roll 32 is mounted on mandrel 26, detachable flange 24 is re-attached and assembly 10 is ready to be attached to bucket 12 of loader 14.

Figure 3:
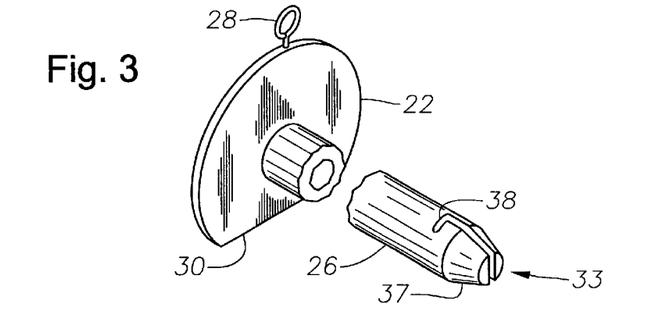
FIG. 3 is an isometric detail of the fixed flange and mandrel of FIG. 1.
Figure 4:
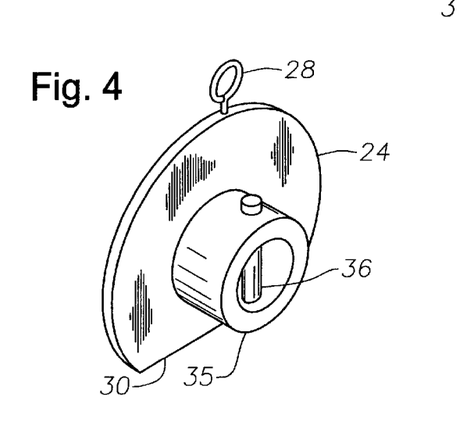
FIG. 4 is an isometric view of the detachable flange of FIG. 2.

Referring now to FIGS. 3 and 4, detachable flange 24 is preferably secured to mandrel 26 by a pin and J-slot arrangement. Mandrel 26 has one end attached to flange 22 and another end 33 free for attachment to flange 24. Free end 33 of mandrel 26 includes a J-slot 38 cut through its diameter and a tapered cone end 37. Detachable flange 24 of FIG. 4 includes a short tubular extension 35 through which cone end 37 of mandrel 26 is engaged. Diametrically engaged through extension 35 of flange 24 is a pin 36 that corresponds to the width of J-slot 38. When cone end 37 is engaged within extension 35 of flange 24, pin 36 is concurrently engaged within J-slot 38 of mandrel 26. Once pin 36 is engaged within slot 38, detachable flange 24 is rotated until pin 36 securely retains flange 24 in place by J-slot 38. Alternatively, the pin and J-slot arrangement may be reversed such that tubular extension 35 includes the J-slot and mandrel 26 contains the pin. Alternatively still, the J-slot arrangement of FIGS. 3 and 4 may be replaced with a simple removable pin (not shown) that would engage flanges 22,24 and mandrel 26 therethrough concurrently. Additionally, both flanges 22, and 24 may optionally be detachable from mandrel 26.

Referring again to FIG. 1, the location of hooks 34 on bucket 12 are at the discretion of the end user. It is preferred that the hooks 34 are positioned on bucket 12 such that an imaginary line drawn between them is substantially parallel to the surface of workface 20. It is also preferred that apparatus 10 be mounted upon bucket 12 of loader 14 in such a fashion that the axis of the roll 32 of film 18 be located behind the leading edge 39 of bucket 12 no matter what position bucket 12 may take. An example of an acceptable location is shown in FIG. 1 wherein hooks 34 are attached above the pivot axis of bucket 12 when in the "up" position. By keeping the axis of roll 32 behind the leading edge 39 of bucket 12, it is ensured that ballast material may be effectively deposited to film 18 gravitationally.

Figure 5:
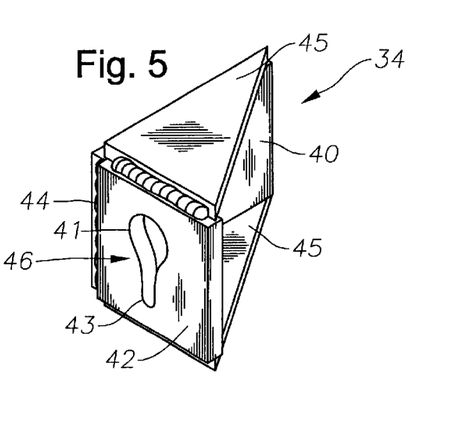
FIG. 5 is a perspective view of a protective shield.

Referring now to FIG. 5, it is preferred that hooks 34 be fashioned from plates 40, 42 of steel welded together at joint 44. Plate 40 is to be welded in the desired location on bucket 12 such that joint 44 is pointed toward leading edge 39. Plate 42 includes an aperture 46 that includes a large profile 41 and a small profile 43. Aperture 46 is arranged such that small profile 43 is located between large profile 41 and workface 20. Small region 43 is constructed to hold a link of chain 16 in place while large profile 41 will allow free engagement therethrough. To connect apparatus 10 to bucket 12, chains 16 are connected from eyelets 28 and through large profile 41 of hook 34. Once the desired length of chain is reached between hook 34 and eyelet 28, chain 16 is then positioned from large profile 41 to small profile 43, where it is held securely in place by the weight of apparatus 10. It is also preferable to attach reinforcement guards 45 above and below plates 40 and 42 to make hooks 34 more robust. If guards 45 are not utilized, hooks 34 can be torn from bucket 12 when bucket 12 extends into the earth to collect material. By protecting hooks 34, guards 45 ensure the long term usability and durability of deployment assembly 10.

Figure 6:
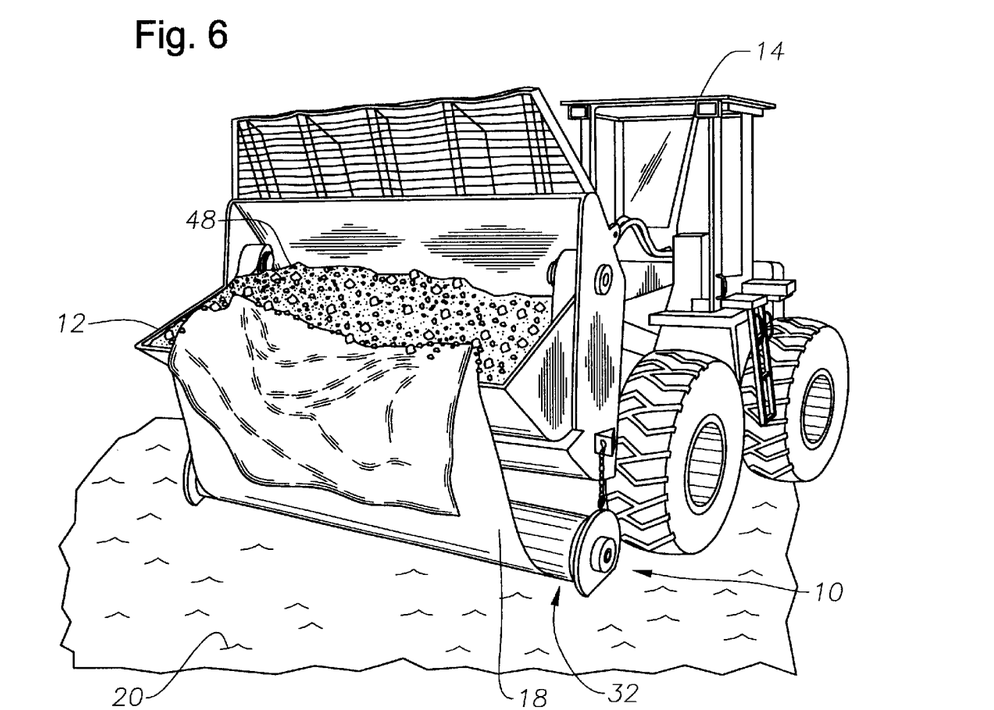
FIG. 6 is a drawing of the wheel loader the film deployer of FIG. 1 before film is deployed.

Referring now to FIG. 6, when a section of landfill to be covered, the following process is performed. First, the operator takes prime loader 14 to an area where the bucket 12 may be filled with a ballast material. Ballast material may be of any form preferable to landfill operators, but typically takes the form of clay, soil, sand, gravel, rock, or a combination thereof. Once bucket 12 is filled with ballast material, the loader 14 is then driven to the location of deployment apparatus 10. Once in position, the operator lowers bucket 12 without spilling ballast material to attach apparatus 10. With bucket 12 lowered, the chains 16 of apparatus 10 are attached to hooks 34 on bucket 12. Preferably, one chain is used to secure each end of apparatus 10 to opposing sides of bucket 12. It should be appreciated that alternative methods of attachment may be used as long as the method is simple and not labor intensive. With apparatus 10 securely attached and positioned underneath, bucket 12 of loader 14 can be raised until apparatus 10 is lifted off of landfill surface. The distance that apparatus 10 hangs from bucket 12 of loader 14 is at the discretion of the operator. One benefit of apparatus 10 is that the attachment chains 16 allows the operator to position apparatus 10 with respect to bucket 12 in such a way as to maximize his or her visibility of the film and ballast as it is laid. Once apparatus 10 is lifted, film 18 may be pulled off roll 32 and preferably tucked into the ballast 48 in bucket 12 as shown in FIG. 6. Alternatively, clips or pins (not shown) may be used to temporarily attached the film 18 to the bucket 12 prior to deployment. Loader 14 and deployment apparatus 10 are now ready to deploy film 18 to landfill surface 20.

Figure 7:
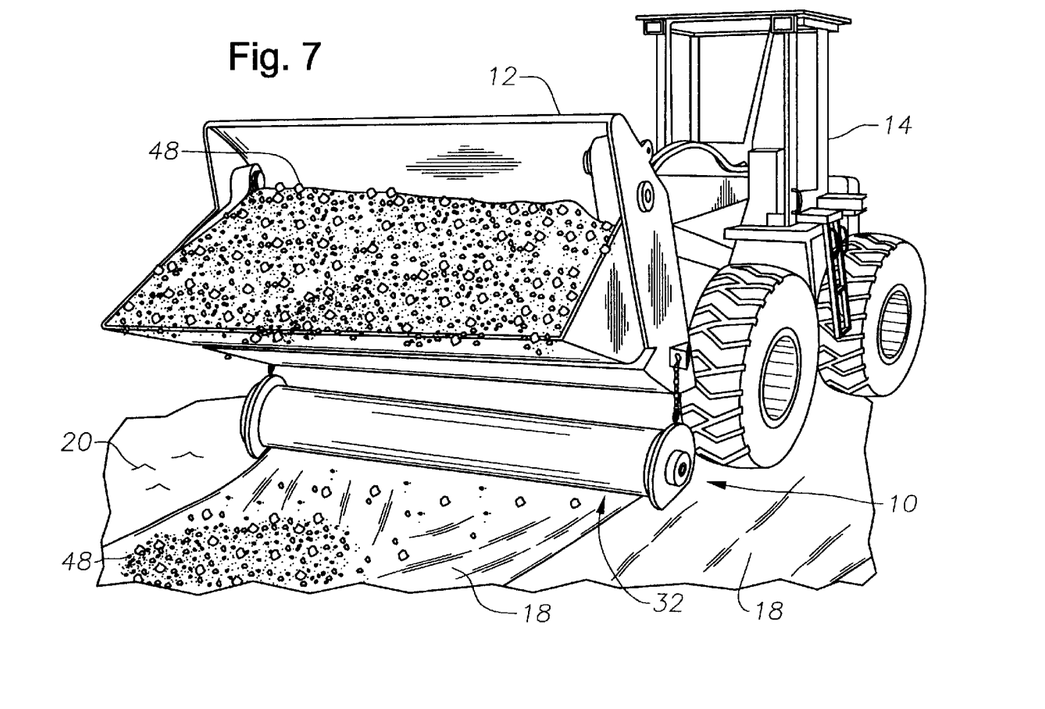
FIG. 7 is a drawing of the wheel loader and film deployer of FIG. 1 during film deployment.

Referring now to FIG. 7, loader 14 with attached deployment apparatus 10 is positioned over an area to be covered. With apparatus 10, the height of the spool of film 18 can be maintained near surface 20 while the bucket 12 is raised high enough for the loader 14 operator to see between bucket 12 and film 18, thus allowing the operator to deploy the film at a higher speed with increased visibility. Further, it is preferable to keep apparatus 10 as low as possible to combat the forces of wind. Loader 14 is positioned to move in reverse over the work area. To start laying a panel of film 18, the controls to bucket 12 are operated to allow a small amount of ballast 48 to fall from bucket 12, releasing tucked film 18 with it. With film 18 upon work surface 20 of the landfill, controls may again be manipulated to drop more ballast 48 upon deposited film 18. With film 18 held in place securely by the weight of the dropped ballast 48, the prime loader 14 is carefully backed over the area to be covered, deploying film 18 as loader 14 progresses rearward. Because of the relatively small weight of apparatus 10 with respect to loader 14, the degree of incline of surface 20 is not as important as with systems described in the prior art. In contrast to those systems, mover 14 carrying apparatus 10 is capable of laying film while backing up inclines as well as while backing down them. Periodically, at intervals to be determined by landfill operation preferences and regulations, the controls are manipulated to cause bucket 12 to deposit more ballast 48 upon film 18. When at the end of a pass over the landfill ballast 48 is deposited on the end of the film panel and the panel is cut manually by the operator or an assistant. Alternatively, an automated film cutting device (not shown) may be employed to cut film 18 at the end of each laid panel. Once film 18 is cut, the film can be tucked into the ballast, and the loader 14 is repositioned to lay an adjacent panel along a similar path. It is preferred that adjacent panels be laid with 6–24 inches of overlap to more effectively "seal" the fill from the environment. Adjacent panels are laid on top of the workface 20 of the landfill until the desired area is properly covered.

Furthermore, it has been shown that the deployment of overlapping adjacent panels of film 18 can be enhanced by the adjustment of the angle that is formed between the axis of mandrel 26 and bucket 12. As described above in reference to FIGS. 1 and 2, this "skew angle" can be adjusted by manipulating the relative lengths of chains 16 at each end of mandrel 26. Additionally, the skew angle may further be manipulated by adjusting the distance between flanges 22,24 to change the effective length of mandrel 26. With apparatus 10 positioned at the desired skew angle with respect to bucket 12, film 18 can be "slung" into their desired overlapping configurations faster and easier than is possible with a mandrel 26 that is positioned substantially parallel to workface 20.

Figure 8:
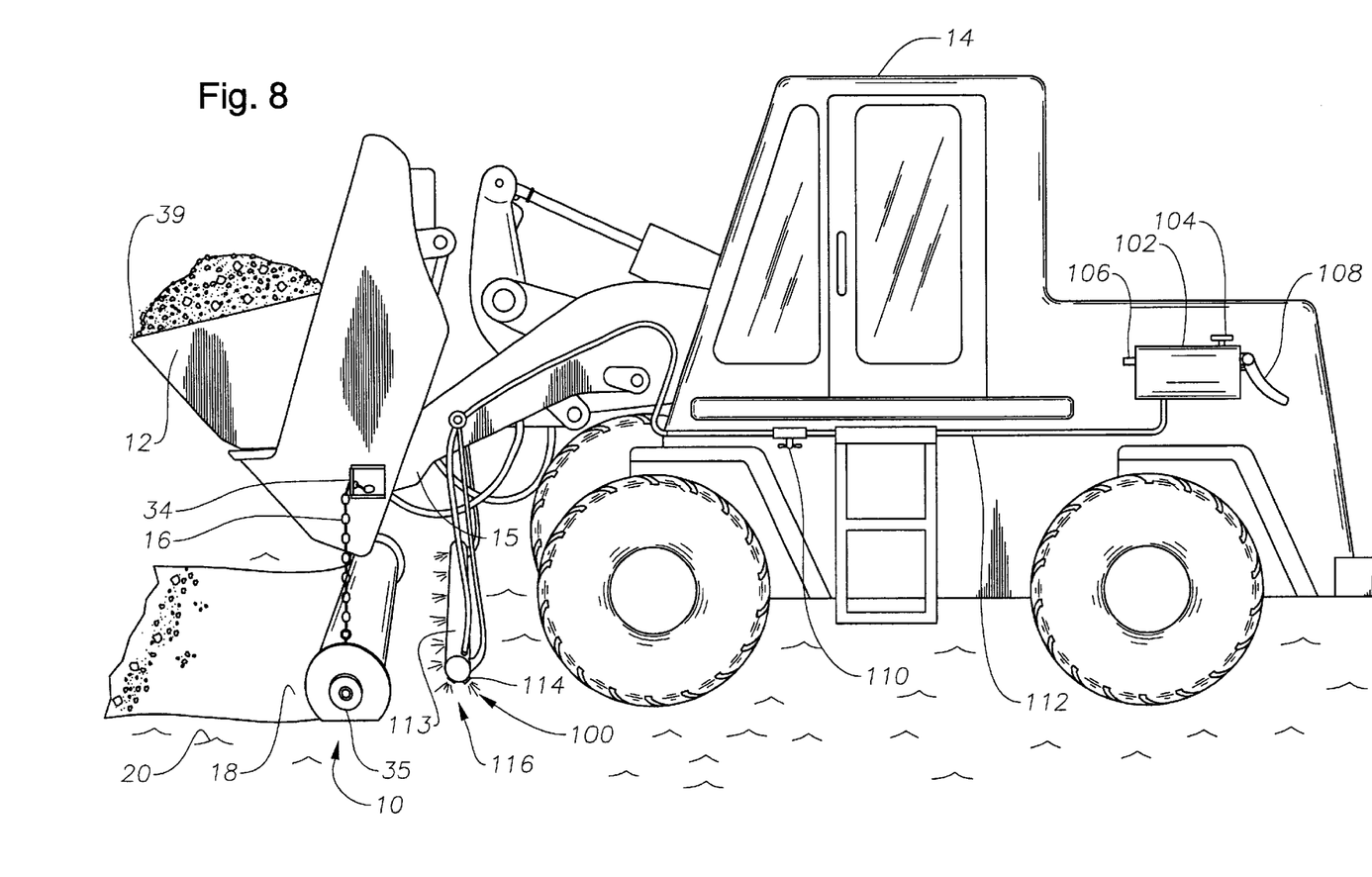
FIG. 8 is the wheel loader and film deployer of FIG. 1 further including a spraying apparatus.

Referring now to FIG. 8, a sprayer apparatus 100 to apply a fluid (liquid or gaseous) is shown attached to loader 14. Sprayer apparatus 100 includes a pressure tank 102 and a pressure cap 104. Attached to pressure tank 102 is a pressure relief valve 106 and a charging pump 108. A shut off valve 110 is connected to the bottom of tank 102 and controls the flow of liquid solution from the tank 102 to a hose 112. Attached at the end of hose 112 is a spray manifold or bar 113 with at least one spray head 114 to create a spray pattern 116 when liquid flows therethrough under pressure. Spray bar 113 preferably extends across the width of the loader 14 with distributed spray head 114 placement to more effectively cover the workface. It should be appreciated an single spray head with a wide path of coverage may communicate directly with hose 112, thus eliminating the need for a manifold device. As also shown in FIG. 8, loader 14 can be comprised of different parts, one part being container or bucket 12 and the other part being lift 15. In one embodiment, the container or bucket 12 is rotatably mounted to lift 15.

To operate sprayer apparatus 100, pressure cap 104 is unscrewed and the liquid to be sprayed is poured into tank 102. With the liquid in tank 102, pressure cap 104 is replaced and charging pump 108 is activated until the pressure within tank 102 reaches a predetermined level. Charging pump 108 may be of a manual or powered type and may or may not include a pressure indication device (not shown) to indicate when the pressure contained within tank 102 is sufficient. With sufficient pressure in tank 102, shut off valve 110 may be manipulated to allow the pressurized liquid to flow through hose 112 and head 114 to spray liquid 116 upon workface 20.

Sprayer 100 is preferably located and operated in a position that applies fluid to workface 20 following loader 14, but before the deployment of film 18 and ballast 48. It is preferred that sprayer 100 contain and apply a pesticide solution to the topside workface 20 in order to control the spread of flies, mosquitos, or any other annoying insect pest, but is understood that any beneficial chemical may be applied using sprayer 100. Examples of other beneficial chemicals that can be applied using sprayer 100 are deodorants, degradation inhibitors, or degradation accelerators.

In conclusion, apparatus 10 of the present invention has many advantages over the prior art. A primary advantage is reduced cost. Prior art equipment is expensive and complex, requiring systems of hydraulics, motors, and other machinery. Additionally, reliability of prior art systems is questionable when used in extreme environmental conditions. Apparatus 10 of the present invention costs a fraction of those of the prior art and operates reliably in all weather conditions. In addition to a low cost of ownership, apparatus 10 offers landfill operators reduced heavy equipment costs. Prior art systems require heavy prime movers that are capable carrying deployment units that weigh several tons. In contrast, apparatus 10 only weighs a few hundred pounds and can be carried by smaller and less expensive machines. Almost all landfill loaders will be capable of carrying apparatus 10. Furthermore, a device in accordance with the present invention may even be attached to the rear of a dump truck to deploy film in a manner consistent with that described above.

Another primary advantage of the present invention is reduced complexity and maintenance cost. Using apparatus 10, ballast material can be of any size or shape available to the operator since a motorized material movement system or auger is not used. Prior art system required that ballast material be filtered through a screening mechanism to ensure that the ballast does not clog the various augers or chutes. In contrast, apparatus 10 does not require any such limitations since the bucket container of the holder being used to carry the apparatus is used and no material deposit equipment other than the tilting operation of the bucket container is needed. Any material that can be loaded into the bucket container can be deposited atop the deployed covering. Furthermore, prior art systems require a frame to support the ballast container and delivery system. Because apparatus 10 does not require such structural heft, it can be easily attached and removed to the loader vehicle, enabling quick changes of film rolls and maintaining the effectiveness of landfill equipment. Vehicles carrying devices of the prior art would be unable to perform their prescribed duties while covering operations are underway and would require time consuming reconfiguration operations to add or remove prior art film deployers. Movers carrying apparatus 10 can often be used for their designed purposes while apparatus 10 is still attached. If not, apparatus 10 can be removed from the vehicle in a matter of seconds. Finally, if the ballast in the bucket of a mover carrying apparatus 10 is depleted, the operator can release apparatus 10, refill the bucket with ballast, reattach apparatus 10 and continue laying without having to make a cut in the panel of film.

Another benefit of apparatus 10 of the present invention is the flexibility in the sizes and types of films and or materials it can deploy. Using apparatus 10, any width or thickness of film is capable of being deployed. Because systems of the prior art are framed with rigid members, the width of a panel of film laid by those systems is limited to the maximum amount of space between those members. Apparatus 10 has no such limitation, enabling film panels to be as wide or narrow as the operator desires. Furthermore, because of the simple design of apparatus 10, any material that can be spooled up onto a roll can be deployed to the landfill surface. Such materials can include plastic films, elastomeric sheets, and textiles.

Numerous variations and modifications will become apparent to those skilled in the art once the above disclosure is fully appreciated. It is intended that the following claims be interpreted to embrace all such variations and modifications.

What is claimed is:

1. An apparatus mounted on a vehicle to deploy a covering on a landfill, the apparatus comprising:

a spool adapted to support the covering;

a container carrying and dispensing ballast, said container being coupled to the vehicle;

connection members extending between said container and said spool, said connection members being releasably mounted on said container allowing said spool to hang downwardly with gravity beneath said container and adapted for suspending the covering below said container to deploy the covering over the landfill;

said spool being releasably attached to said container by said connection members for replenishing said spool with covering; and wherein said spool includes a mandrel extending between opposed flanges, said connection members having one end attached to said flanges.

2. The apparatus of claim 1 wherein said opposed flanges include a first flange coupled to one end of said mandrel and a second flange detachably connected to another end of said mandrel.

3. The apparatus of claim 2 wherein said second flange is connected to said mandrel by a J-slot and pin.

4. The apparatus of claim 1 wherein said flanges include a flat side.

5. An apparatus mounted on a vehicle to deploy a covering on a landfill, the apparatus comprising:

a spool adapted to support the covering;

a bucket disposed on the vehicle, said bucket being used to hold and dispense ballast;

connection members extending between said bucket and said spool, said connection members being pivotally mounted on said bucket allowing said spool to hang downwardly with gravity beneath said bucket and adapted for suspending the covering below said bucket to deploy the covering over the landfill;

said spool being releasably attached to said bucket by said connection members for replenishing said spool with covering; and further including a sprayer disposed between said spool and the vehicle to apply a chemical solution.

6. The apparatus of claim 5 where said chemical solution includes a pesticide.

7. The apparatus of claim 5 wherein said chemical solution is a deodorizer.

8. An apparatus mounted on a vehicle to deploy a covering on a landfill, the apparatus comprising:

a spool adapted to support the covering;

a container for holding ballast, said container being coupled to the vehicle;

connection members extending between said container and said spool, said connection members being pivotally mounted on said container allowing said spool to hang downwardly with gravity beneath said container and adapted for suspending the covering below the lift to deploy the covering over the landfill; and said spool being releasably attached to said container by said connection members for replenishing said spool with covering, wherein an axis of rotation of said container is above an axis of rotation of the spool.

9. The apparatus of claim 8 wherein a plane formed through the axes is vertical.

10. An apparatus for covering a landfill comprising:
   a vehicle having a lift wish a container disposed thereon;
   a spool suspended below said container;
   connection members extending between said container and said spool, said connection members being pivotally mounted on said container allowing said spool to hang downwardly with gravity beneath said container;
   a roll of film disposed on said spool; and
   ballast disposed in said container, said lift tilting said container to drop ballast onto said film.

11. The apparatus of claim 10 wherein said spool includes a mandrel disposed between flanged ends, said connection members having one end attached to said flanges.

12. The apparatus of claim 11 wherein said spool includes a mandrel disposed between said flanged ends having sector cuts.

13. The apparatus of claim 11 further including bearing members disposed between said mandrel and said roll.

14. The apparatus of claim 13 wherein said bearing members are roller or ball bearings.

15. The apparatus of claim 10 further comprising a sprayer to apply a chemical solution.

16. The apparatus of claim 15 wherein said chemical solution includes a pesticide.

17. The apparatus of claim 15 wherein said chemical solution includes a deodorant.

18. The apparatus of claim 10 wherein the vehicle is a dump truck.

19. The apparatus of claim 10 wherein the vehicle is a front end wheel loader.

20. The apparatus of claim 10 wherein said spool is suspended below the lift of the vehicle.

21. The apparatus of claim 10 wherein the length of each of said connection members is adjustable.

22. The apparatus of claim 21 wherein said container defines a container axis and said spool defines a spool axis, said container axis and said stool axis being related by a skew angle.

23. The apparatus of claim 22 wherein the lengths of said connection members are adjusted to manipulate said skew angle to facilitate the deployment of the covering.

24. A method for covering a landfill surface comprising:
   hanging a roll of film from a bucket on a mover;
   rotatably disposing the roll of film on a spool below the bucket;
   moving the mover over the landfill surface;
   rotating the roll on the spool to unroll a panel of film from the roll;
   deploying the film onto the landfill surface; and
   operating the bucket to deposit ballast on top of the deployed film from the bucket.

25. The method of claim 24 further including overlapping adjacent panels of film on the landfill surface.

26. The method of claim 25 further including cutting the film to form the adjacent panels, the cutting being performed by an automated cutting device.

27. The method of claim 24 further including spraying a chemical solution on the landfill prior to deploying the film to the surface.

28. The method of claim 24 further including pouring the ballast from the bucket onto the film.

29. The method of claim 24 wherein the roll is wider than the mover.

30. The method of claim 24 further including intermittently depositing ballast onto the film.

31. The method of claim 24 further including varying the volume of ballast deposited onto the film.

32. The method of claim 24 wherein the roll of film is deposed at an angle to an axis of the bucket.

33. The method of claim 32 further comprising adjusting the angle of the roll of film to facilitate the deployment of the covering to the landfill.

34. A method for covering a surface of a landfill comprising:
   depositing ballast material in a bucket device of a loader;
   hanging a film deployer from the bucket device;
   backing the loader over the surface;
   deploying the film from a spool mounted below the bucket; and
   tilting the bucket device to deposit ballast material on top of the film from the bucket.

35. The method of claim 34 wherein adjacent panels of the film are deployed atop the surface of the landfill.

36. The method of claim 35 wherein adjacent panels of the film overlap.

37. The method of claim 36 wherein the film deployer is disposed at an angle to an axis of the bucket device of the loader.

38. The method of claim 37 further comprising adjusting the angle of the film deployer to facilitate the overlapping of the panels of film.

39. The method of claim 34 further including spraying a chemical pesticide on the landfill surface prior to deploying said film.

40. An apparatus for mounting on a vehicle to deploy a covering on a landfill, comprising:
   a spool adapted to support the covering;
   a ballast container capable of being coupled to the vehicle; and
   connection members extending between said container and said spool, said connection members being pivotally mounted on the said container allowing said spool to hang downwardly with gravity beneath the said container and adapted for suspending the covering below said container to deploy the covering over the landfill, wherein said spool includes a mandrel extending between opposed flanges.

41. The apparatus of claim 40 wherein said opposed flanges include a first flange coupled to one end of said mandrel and a second flange detachably connected to another end of said mandrel.

42. The apparatus of claim 41 wherein said second flange is connected to said mandrel by a J-slot and pin.

43. The apparatus of claim 40 wherein said flanges include a flat side.

44. An apparatus for mounting on a vehicle to deploy a covering on a landfill, comprising:
   a spool adapted to support the covering;
   a ballast container capable of being coupled to the vehicle; and
   connection members extending between said container and said spool, said connection members being pivotally mounted on the said container allowing said spool to hang downwardly with gravity beneath the said container and adapted for suspending the covering below said container to deploy the covering over the landfill, further including a sprayer disposed between said spool and the vehicle to apply a chemical solution.

45. The apparatus of claim 44 where said chemical solution includes a pesticide.

46. An apparatus for mounting on a lift of a vehicle to deploy a covering on a landfill, comprising:
a spool adapted to support the covering;
connection members releasably attached to said spool and adapted far suspending the covering below the lift to deploy the covering over the landfill;
a sprayer to apply a chemical solution is disposed between said spool and the vehicle;
said chemical solution includes a pesticide; and
said chemical solution being a deodorizer.

47. An apparatus for covering a landfill comprising:
a vehicle having a lift with a container disposed thereon;
a spool suspended below said container;
connection members extending between said container and said spool, said connection members being pivotally mounted on said container allowing said spool to hang downwardly with gravity beneath said container;
a roll of film disposed on said spool; and
ballast disposed in said container, said lift capable of tilting said container to drop ballast onto said film.

48. The apparatus of claim 47 wherein said spool includes a mandrel disposed between flanged ends.

49. The apparatus of claim 48 further including bearing members disposed between said mandrel and said roll.

50. The apparatus of claim 49 wherein said bearing members are roller or ball bearings.

51. The apparatus of claim 48 wherein said spool includes a mandrel disposed between said flanged ends having sector cuts adapted to face the landfill.

52. The apparatus of claim 47 further comprising a sprayer to apply a chemical solution to the landfill.

53. The apparatus of claim 52 wherein said chemical solution includes a pesticide.

54. The apparatus of claim 47 wherein the vehicle is a dump truck.

55. The apparatus of claim 47 wherein the vehicle is a front end wheel loader.

56. An apparatus for covering a landfill comprising:
a vehicle having a container disposed thereon which may raised, lowered and tilted;
a spool suspended below said container;
a roll of film disposed on said spool;
ballast disposed in said container,
said spool including a mandrel disposed between flanged ends; and
said flanged ends including sector cuts adapted to face the landfill.

57. An apparatus for covering a landfill comprising:
a vehicle having a container disposed thereon which may raised, lowered and tilted;
a spool suspended below said container,
a roll of film disposed on said spool;
ballast disposed in said container;
a sprayer to apply a chemical solution to the landfill; and
said chemical solution including a deodorant.

58. A method for covering a landfill surface comprising:
hanging a roll of film from a bucket on a mover;
rotatably disposing the roll of film on a spool below the bucket;
moving the mover over the landfill surface;
rotating the roll on the spool to unroll a panel of film from the roll;
deploying the film onto the landfill surface; and
selectively tilting the bucket to deposit ballast on top of the deployed film from the bucket.

59. The method of claim 58 further including overlapping adjacent panels of film on the landfill surface.

60. The method of claim 58 further including pouring the ballast from the bucket onto the film.

61. The method of claim 58 wherein the roll is wider than the mover.

62. The method of claim 58 further including intermittently depositing ballast onto the film.

63. The method of claim 58 further including varying the volume of ballast deposited onto the film.

64. A method for covering a landfill surface comprising:
rotatably disposing a roll of film on a spoof below a bucket on a mover;
moving the mover over the landfill surface;
rotating the roll on the spool to unroll a panel of film from the roll;
deploying the film onto the landfill surface;
selectively depositing ballast on top of the deployed film from the bucket; and
spraying a chemical solution on the landfill prior to deploying the film to the surface.

65. A method for covering a surface of a landfill comprising:
depositing ballast material in a bucket device of a loader;
hanging a film deployer from the bucket device;
backing the loader over the surface;
deploying the film from a spool mounted below the bucket; and
tilting the bucket device to deposit ballast material on top of the film from the bucket, wherein adjacent panels of the film overlap.

66. A method for covering a surface of a landfill comprising:
depositing ballast material in a bucket device of a loader;
mounting a film deployer to the bucket device;
backing the loader over the surface;
deploying the film from a spool mounted below the bucket;
depositing ballast material on top of the film from the bucket; and
spraying a chemical pesticide on the landfill surface prior to deploying said film.

* * * * *